(12) United States Patent
Maruyama et al.

(10) Patent No.: US 9,731,583 B2
(45) Date of Patent: Aug. 15, 2017

(54) VEHICLE DOOR STRUCTURE

(71) Applicant: KABUSHIKI KAISHA TOYOTA JIDOSHOKKI, Aichi (JP)

(72) Inventors: Katsuya Maruyama, Aichi (JP); Hiroshi Kuno, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 15/066,401

(22) Filed: Mar. 10, 2016

(65) Prior Publication Data

US 2016/0272054 A1     Sep. 22, 2016

(30) Foreign Application Priority Data

Mar. 19, 2015   (JP) ................. 2015-056770

(51) Int. Cl.
| | |
|---|---|
| *E05F 11/00* | (2006.01) |
| *B60J 5/04* | (2006.01) |
| *B60J 5/06* | (2006.01) |
| *E05D 15/06* | (2006.01) |

(52) U.S. Cl.
CPC ............. *B60J 5/047* (2013.01); *B60J 5/06* (2013.01); *E05D 15/0604* (2013.01); *E05Y 2900/531* (2013.01)

(58) Field of Classification Search
CPC ......... B60J 5/047; B60J 5/06; E05D 15/0604; B60Y 2304/05; B60Y 2304/03; E05Y 2900/531
USPC ......................................................... 49/360
See application file for complete search history.

(56) References Cited

U.S. PATENT DOCUMENTS

| | | | | |
|---|---|---|---|---|
| 3,100,667 A | * | 8/1963 | Schwenk ................. | B60J 5/062 49/214 |
| 4,110,934 A | * | 9/1978 | Zens .................... | E05D 15/101 296/155 |
| 4,569,553 A | * | 2/1986 | Speth ........................ | B60J 5/06 296/155 |
| 4,872,287 A | * | 10/1989 | Block ................. | E05B 65/0823 16/87 R |
| 4,896,906 A | * | 1/1990 | Weinerman ........... | E05B 77/265 292/337 |
| 4,917,412 A | * | 4/1990 | Swan .................... | E05B 77/265 292/216 |

(Continued)

FOREIGN PATENT DOCUMENTS

JP           2011-46271            3/2011

*Primary Examiner* — Jerry Redman
(74) *Attorney, Agent, or Firm* — Greenblum & Bernstein, P.L.C.

(57) ABSTRACT

A vehicle door structure 1 includes a lock mechanism 40. The lock mechanism 40 includes a portion to be locked 50 provided to a guided body 18, a first locking portion 60 arranged at a position that corresponds to the portion to be locked 50 when the slide door 6 is in the fully closed position, and a second locking portion 70 arranged at a position that corresponds to the portion to be locked 50 when the slide door 6 is in the fully open position. The portion to be locked 50, in the fully closed position or the fully open position, protrudes toward the first locking portion 60 or the second locking portion 70 and is locked by the first locking portion 60 or the second locking portion 70. The second locking portion 70 protrudes toward the portion to be locked 50 when the swing door 70 is opened.

4 Claims, 11 Drawing Sheets

(56) References Cited

U.S. PATENT DOCUMENTS

| | | | | |
|---|---|---|---|---|
| 5,117,665 | A * | 6/1992 | Swan | E05B 77/265 292/48 |
| 5,361,540 | A * | 11/1994 | Rogers, Jr. | E05D 13/04 292/DIG. 46 |
| 5,481,830 | A * | 1/1996 | Gooding | E05D 13/04 292/67 |
| 5,979,971 | A * | 11/1999 | Mizuki | E05B 65/0811 292/219 |
| 5,983,568 | A * | 11/1999 | Cianetti | A47F 3/0434 49/125 |
| 6,042,158 | A * | 3/2000 | Horn | E05D 13/006 16/DIG. 20 |
| 6,135,513 | A * | 10/2000 | Hamada | E05B 77/26 292/201 |
| 6,279,267 | B1 * | 8/2001 | Barrett | E05D 13/04 49/221 |
| 7,114,753 | B2 * | 10/2006 | Nodorft | E05B 47/0002 160/201 |
| 7,156,454 | B1 * | 1/2007 | Dogan | B60J 5/06 16/83 |
| 7,422,268 | B2 * | 9/2008 | Kothe | B60J 5/06 292/DIG. 23 |
| 7,641,261 | B2 * | 1/2010 | Rusnak | E05D 15/101 296/155 |
| 7,654,608 | B2 * | 2/2010 | Krajenke | E05D 15/101 296/155 |
| 7,669,367 | B2 * | 3/2010 | Shimura | B60J 5/06 296/155 |
| 7,699,363 | B2 * | 4/2010 | Langfermann | E05B 63/143 292/201 |
| 7,753,436 | B2 * | 7/2010 | Kim | B60J 5/0487 296/155 |
| 7,934,767 | B2 * | 5/2011 | Kim | B60J 5/062 296/155 |
| 8,328,270 | B2 * | 12/2012 | Kitayama | B60J 7/192 296/146.1 |
| 8,567,126 | B2 | 10/2013 | Hozumi et al. | |
| 8,713,852 | B2 * | 5/2014 | Choi | E06B 3/46 296/146.11 |
| 8,776,434 | B2 * | 7/2014 | Terasaki | B61D 19/026 49/116 |
| 8,807,626 | B2 * | 8/2014 | Kwon | E05D 15/101 296/146.4 |
| 8,925,248 | B2 * | 1/2015 | Maruyama | B60J 5/047 296/146.11 |
| 9,074,398 | B2 * | 7/2015 | Maruyama | E05D 15/48 |
| 9,267,317 | B2 * | 2/2016 | Vu | E05F 5/06 |

* cited by examiner

VEHICLE DOOR STRUCTURE

TECHNICAL FIELD

The present invention relates to a vehicle door structure.

BACKGROUND

As a vehicle door structure, a structure described in Japanese Unexamined Patent Publication No. 2011-46271, for example, has been known. The vehicle door structure described in Japanese Unexamined Patent Publication No. 2011-46271 includes a slide door and a swing door. The slide door is structured slidably with respect to a vehicle body and the swing door, and also the swing door is structured swingably with respect to the vehicle body. In a vehicle door structure as in the above-described conventional technique, for the purpose of improving stability when the slide door is slidingly opening or closing, for example, it is assumed that the slide door is supported by the vehicle body when the slide door is slidingly opening or closing, and the support of the slide door by the vehicle body is released when the slide door has been fully opened.

SUMMARY

In such a vehicle door structure as described above in which the slide door is supported by the vehicle body when the slide door is opening or closing, in order to ensure safety when the swing door is opening or closing and in order to reduce load on a swinging member configure to swing the swing door, it is preferable to maintain a state in which the slide door overlaps the swing door when the swing door is opening or closing. However, because the handle of the slide door can be operated, when the handle of the slide door is mistakenly operated with the swing door open, fixation between the slide door and the swing door is released. This may cause a situation in which the slide door is not supported by the vehicle body and thus the slide door comes out of the swing door.

An object of the present invention is to provide a vehicle door structure that can prevent a slide door from coming out of a swing door when the swing door is opened.

A vehicle door structure according to an aspect of the present invention is a vehicle door structure including: a slide door configured to slidingly open and close one partial area of a door opening portion formed on a vehicle body; a swing door pivotally attached to the vehicle body via a pivotal support mechanism and configured to externally support the slide door at least when the slide door is fully opened, and to open and close the other partial area of the door opening portion together with the slide door that is fully opened; and a slide mechanism including a slide rail provided extending in an opening/closing direction of the slide door and a guided body guided by the slide rail, the slide mechanism being configured to slide the slide door. The vehicle door structure further includes a lock mechanism configured to lock sliding of the slide door in a fully closed position in which the slide door closes the door opening portion and in a fully open position in which the slide door fully opens the door opening portion. The lock mechanism includes: a portion to be locked provided to the guided body; a first locking portion provided to the slide rail and arranged at a position that corresponds to the portion to be locked when the slide door is in the fully closed position; and a second locking portion provided to the slide rail and arranged at a position that corresponds to the portion to be locked when the slide door is in the fully open position. The portion to be locked, in the fully closed position or the fully open position, protrudes toward the first locking portion or the second locking portion and is locked by the first locking portion or the second locking portion. The second locking portion protrudes toward the portion to be locked when the swing door is opened.

This vehicle door structure includes the lock mechanism that locks sliding of the slide door in the fully closed position in which the slide door closes the door opening portion and in the fully open position in which the slide door fully opens the door opening portion. The lock mechanism includes the second locking portion provided to the slide rail and arranged at the position that corresponds to the portion to be locked when the slide door is in the fully open position. The second locking portion protrudes toward the portion to be locked when the swing door is opened. Consequently, for example, even if the portion to be locked retracts from the second locking portion when the handle is operated, because the second locking portion has protruded toward the portion to be locked, the locked state between the portion to be locked and the second locking portion is maintained. Thus, in the vehicle door structure, the slide door can be prevented from coming out of the swing door.

In one embodiment, the second locking portion may be provided so as to be capable of protruding and retracting, in accordance with opening and closing of the swing door, along a direction in which the slide door overlaps the swing door. This allows the second locking portion to protrude and retract in a direction orthogonal to the sliding direction of the slide door, which makes it possible to more effectively prevent the slide door from coming out of the swing door.

In one embodiment, the second locking portion may include: a locking member configured to lock the portion to be locked; a biasing member configured to bias the locking member in a direction of protruding toward the portion to be locked; and a control portion configured to allow protrusion of the locking member by biasing force of the biasing member when the swing door is opened, and to restrict the protrusion of the locking member when the swing door is closed. This configuration makes it possible to cause the locking member to protrude to be engaged with the portion to be locked when the swing door is opened, and also makes it possible to restrict the protrusion of the locking member when the swing door is closed.

In one embodiment, the portion to be locked may retract in accordance with operation of an operating portion configured to control opening and closing of the slide door and be released from a locked state with the first locking portion or with the second locking portion. This enables locking of sliding of the slide door to be released by operating the operating portion such as a handle. Even if the portion to be locked is configured to retract when the operating portion is operated, because the second locking portion has protruded toward the portion to be locked when the swing door is opened, the locked state between the portion to be locked and the second locking portion is not released even when the operating portion is operated. Thus, when the swing door is opened, operation of the operating portion can be disabled.

According to the present invention, it is possible to prevent the slide door coming out of the swing door when the swing door is opened.

DETAILED DESCRIPTION

Preferred embodiments of the present invention will now be described in detail with reference to the attached drawings. In the description of the drawings, like or equivalent elements are designated by like numerals, and duplicate description is omitted.

The following describes the preferred embodiments of the present invention in detail with reference to the attached drawings. In the description of the drawings, like or equivalent elements are designated by like numerals, and duplicate description is omitted. In the following description, the longitudinal direction, width direction, and height direction of a vehicle (automobile) V are defined as front-and-rear direction, right-and-left direction, and up-and-down direction, respectively.

Figure 1:
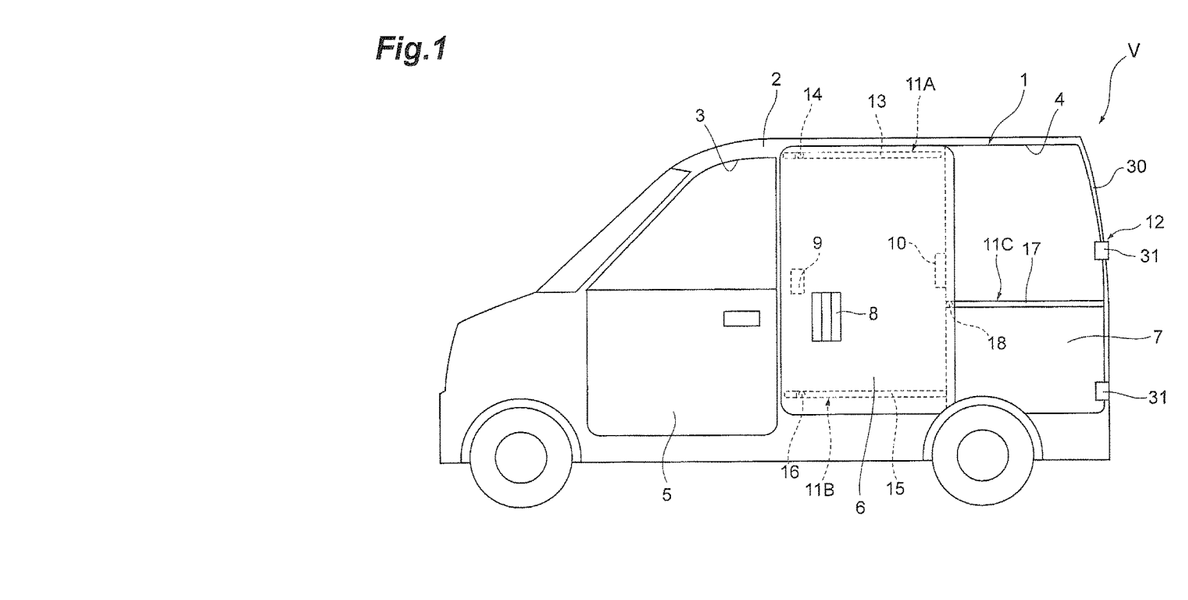
FIG. 1 is a side view of a vehicle including a vehicle door structure according to one embodiment.

FIG. 1 is a side view of a vehicle including a vehicle door structure 1 according to one embodiment. As depicted in FIG. 1, this vehicle V is provided with the vehicle door structure 1. In the present embodiment, the vehicle door structure 1 is provided to a side portion of a vehicle body 2. On the side portion of the vehicle body 2, a front door opening portion 3 positioned at a side of a front seat and a rear door opening portion 4 positioned at a side of a luggage compartment arranged behind the front seat are formed. The door opening portion 3 is opened and closed by a front door 5.

Figure 2A:
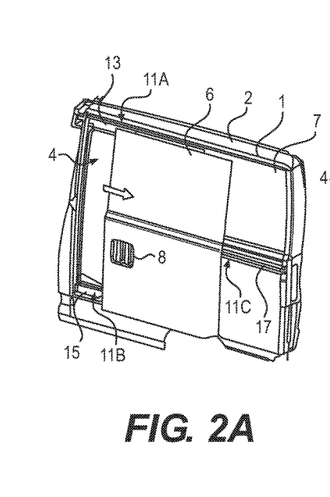
FIG. 2A is a perspective view illustrating a state in which a slide door is opened.
Figure 2B:
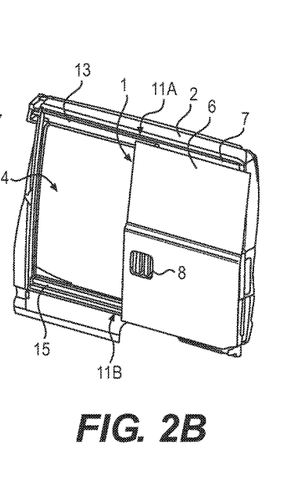
FIG. 2B is a perspective view illustrating a fully open state of the slide door.
Figure 2C:
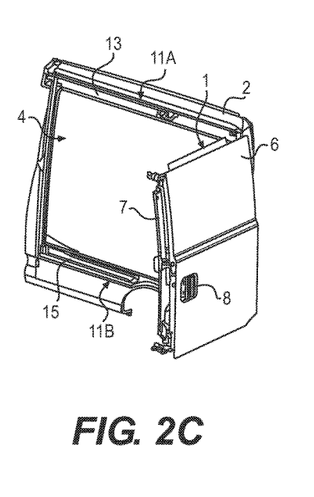
FIG. 2C is a perspective view illustrating a state in which a swing door is opened.

FIG. 2A is a perspective view illustrating a state in which a slide door is opened. FIG. 2B is a perspective view illustrating a fully open state of the slide door. FIG. 2C is a perspective view illustrating a state in which a swing door is opened. The rear door opening portion 4 is opened and closed by this slide-openable slide door 6 and this swing-openable swing door 7. As depicted in FIG. 2A, the slide door 6 is configured to slidingly move in the longitudinal direction of the vehicle body 2 so as to open and close a front area (one partial area) of the rear door opening portion 4. As depicted in FIG. 2B, the slide door 6 is positioned outside the swing door 7 to overlap the swing door 7 when the slide door 6 has been fully opened.

As depicted in FIG. 2C, the swing door 7 is configured to pivotally rotate with respect to the vehicle body 2 when the slide door 6 is fully opened so as to open and close a rear area (the other partial area) of the rear door opening portion 4 together with the slide door 6.

On an outer front part of the slide door 6, a slide-door outer door handle (operating portion) 8 for opening and closing the slide door 6 is provided. On an inner front part of the slide door 6, a slide-door inner door handle (operating portion) 9 for opening and closing the slide door 6 is provided. On a front end of the swing door 7, a swing door handle 10 for opening and closing the swing door 7 is provided.

The vehicle door structure 1 includes slide support mechanisms (slide mechanism) 11A, 11B, and 11C slidably supporting the slide door 6 in the longitudinal direction of the vehicle body 2 and a pivotal support mechanism 12 pivotally supporting the swing door 7 with respect to the vehicle body 2.

The slide support mechanism 11A includes an upper slide rail 13 provided on an upper part of the vehicle body 2 and extending in the longitudinal direction of the vehicle body 2 and a guided body 14 provided on a front upper part of the slide door 6 and configured to be guided by the upper slide rail 13 when the slide door 6 is opening and closing. In the fully open state (fully open position) in which the slide door 6 has been fully opened, the guided body 14 is separated from the upper slide rail 13 to be movable in the vehicle width direction. The slide support mechanism 11B includes a lower slide rail 15 provided on a lower part of the vehicle body 2 and extending in the longitudinal direction of the vehicle body 2 and a guided body 16 provided on a front lower part of the slide door 6 and configured to be guided by the lower slide rail 15 when the slide door 6 is opening and closing. In the fully open state in which the slide door 6 has been fully opened, the guided body 16 is separated from the lower slide rail 15 to be movable in the vehicle width direction.

Figure 3:
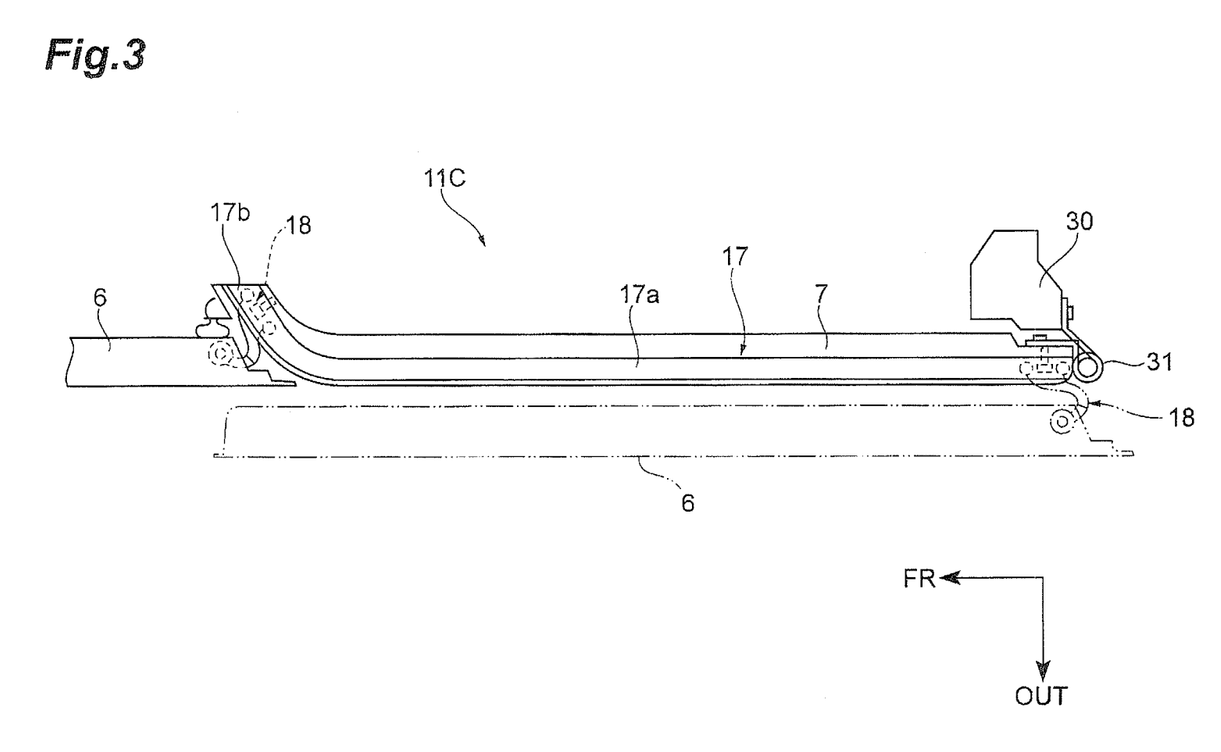
FIG. 3 is a plan view illustrating a slide support mechanism depicted in FIG. 1 with the slide door and the swing door.

FIG. 3 is a plan view illustrating the slide support mechanism 11C depicted in FIG. 1 with the slide door 6 and the swing door 7. As depicted in FIG. 3, the slide support mechanism 11C includes a middle slide rail 17 provided near a central part of the swing door 7 and extending in the longitudinal direction of the swing door 7 and a guided body 18 provided at a rear end of the slide door 6 and configured to be guided by the middle slide rail 17 when the slide door 6 is opening and closing. The middle slide rail 17 includes a main rail portion 17a extending in the longitudinal direction (sliding direction of the slide door 6) of the vehicle body in the fully closed state of the swing door 7 and also a bent rail portion 17b that is bent inward from a front end of the main rail portion 17a (end on a side corresponding to a closing direction of the slide door 6). The bent rail portion 17b is obliquely bent inward and forward of the main rail portion 17a.

Figure 4:
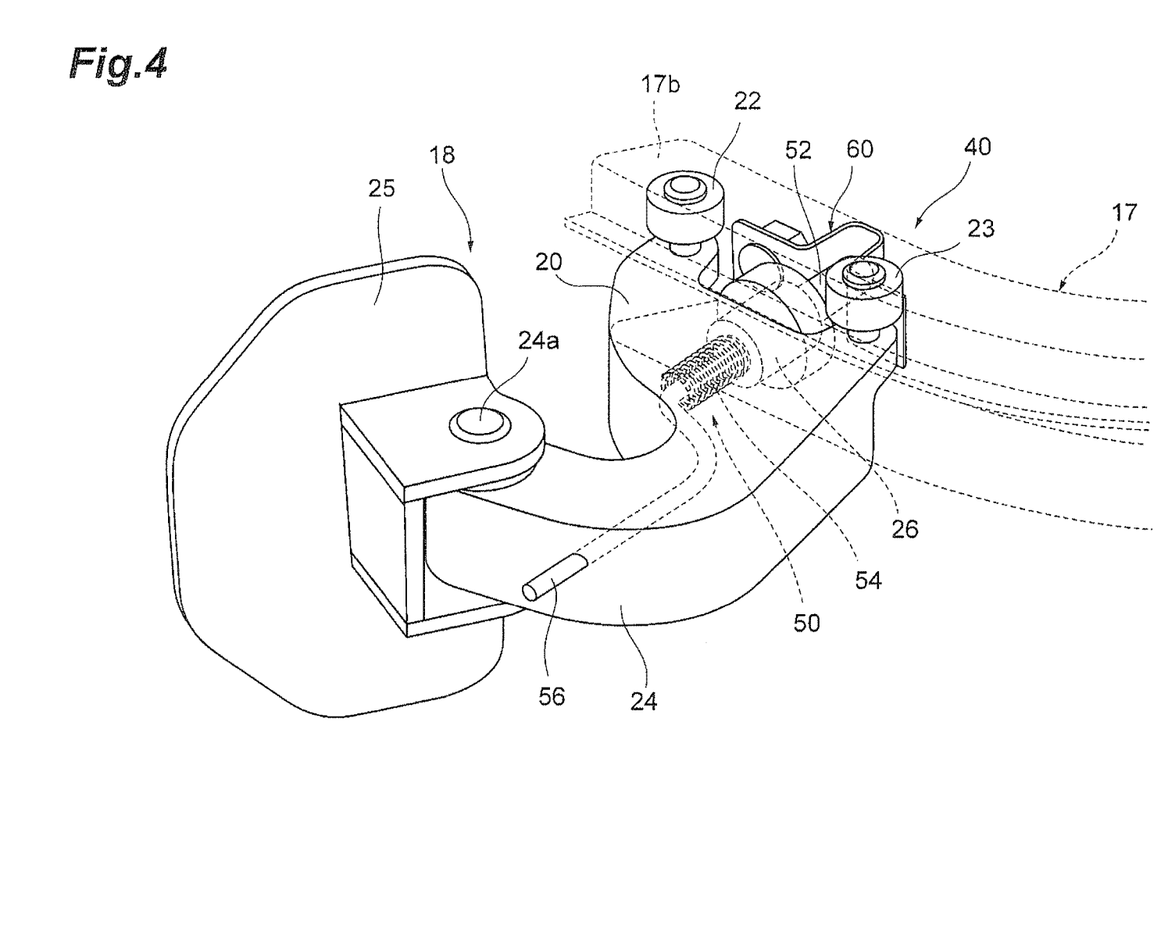
FIG. 4 is a perspective view illustrating a guided body and a slide rail.
Figure 5:
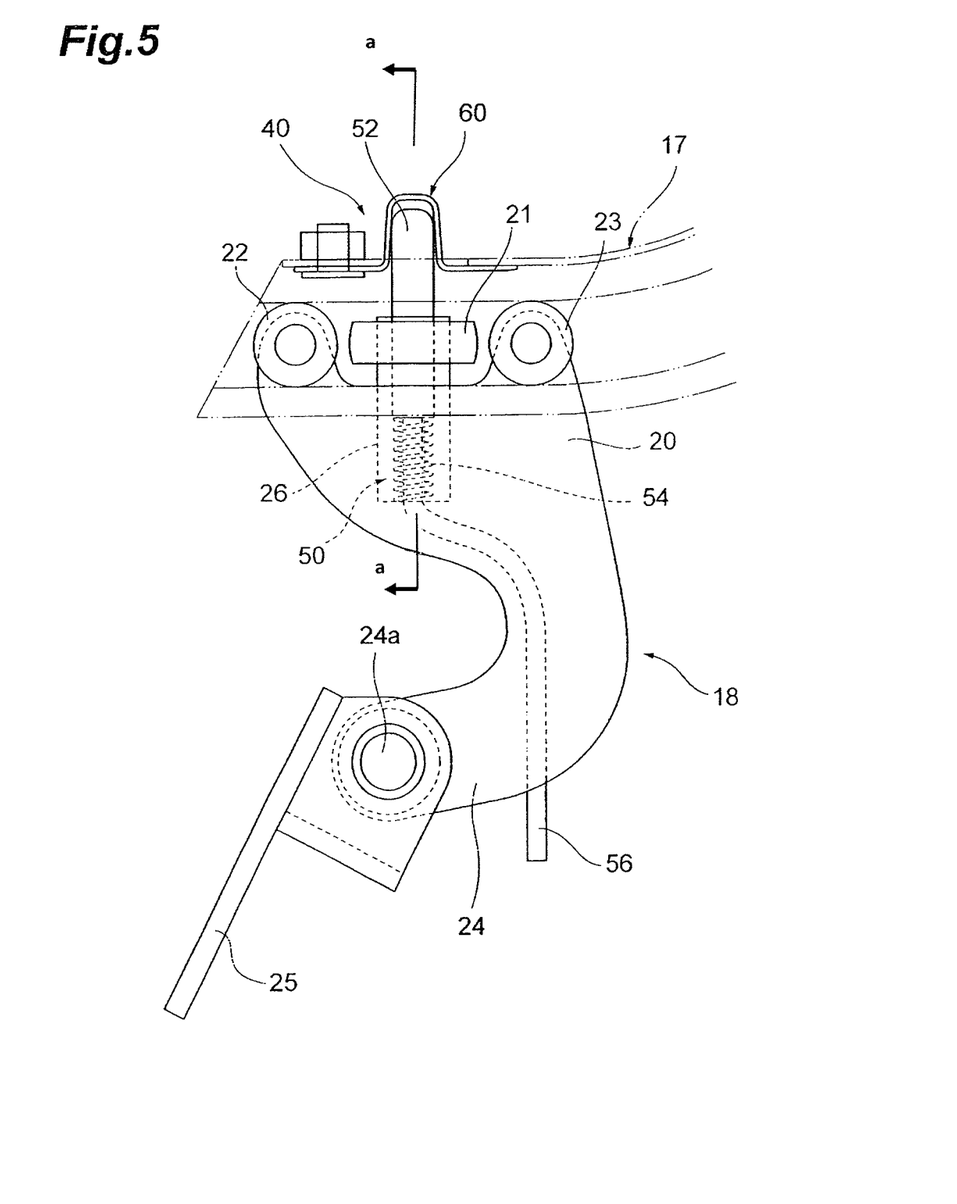
FIG. 5 is a plan view illustrating the guided body and the slide rail.

FIG. 4 is a perspective view illustrating the guided body and the slide rail. FIG. 5 is a plan view illustrating the guided body and the slide rail. As depicted in FIG. 4 and FIG. 5, the guided body 18 includes a main body portion 20, a vertical roller 21 configured to move along the middle slide rail 17, a pair of front and rear horizontal rollers 22 and 23 configured to move along the middle slide rail 17, an arm portion 24, and a base portion 25. The main body portion 20 rotatably supports the vertical roller 21 and the horizontal rollers 22 and 23.

The vertical roller 21 is arranged between the horizontal rollers 22 and 23. The vertical roller 21 is rotatably supported by a support member 26 provided to the main body portion 20. The support member 26, having a cylindrical shape, has a hollow portion 26a (see FIG. 7). The vertical roller 21 is externally provided to the support member 26, and rotates about a rotation axis L that is the same axis as the central axis of the support member 26.

The horizontal rollers 22 and 23 restrict movement of the vertical roller 21 in a direction parallel to the rotation axis L (width direction of the vehicle body 2 in the present embodiment) in the middle slide rail 17. Specifically, the horizontal rollers 22 and 23 are in contact with a side surface 17c and a side surface 17d (see FIG. 7) of the middle slide rail 17 positioned on both sides of the horizontal rollers 22 and 23 and therefore restricted in the motion in the width direction of the vehicle body 2.

The arm portion 24 is formed integrally with the main body portion 20. The arm portion 24 connects the main body portion 20 to the base portion 25. The base portion 25 is fixed inside the slide door 6. The arm portion 24 is provided onto the base portion 25 pivotally about a shaft 24a extending along the height direction of the vehicle body 2.

The pivotal support mechanism 12 includes a hinge 31 that pivotally couples the swing door 7 to a rear pillar 30 provided to a rear end of the vehicle body 2. The hinge 31 is provided in plurality, for example, two spaced apart in the up-and-down direction.

In the present embodiment, the vehicle door structure 1 includes a lock mechanism 40. The lock mechanism 40 locks sliding of the slide door 6 in a fully closed position in which the slide door 6 closes the front area of the rear door opening portion 4 and in a fully open position in which the slide door 6 fully opens the front area of the rear door opening portion 4. The lock mechanism 40 includes a portion to be locked 50, a first locking portion 60, and a second locking portion 70.

The portion to be locked 50 is provided to the guided body 18. The portion to be locked 50 includes a lock pin 52, a spring 54, and a linkage member 56.

Figure 7:
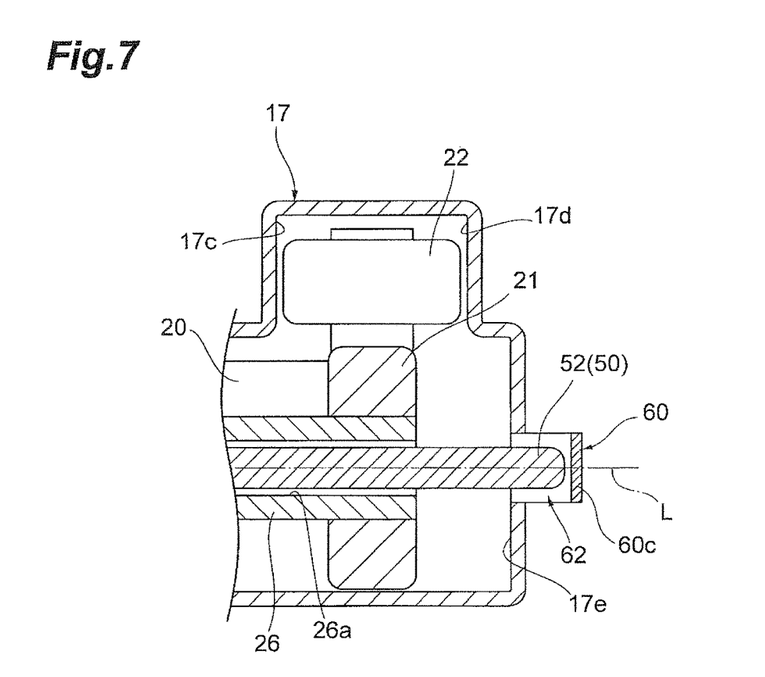
FIG. 7 is a sectional view along line a-a in FIG. 5 illustrating a state in which a portion to be locked is locked by the locking portion.

The lock pin 52 is a rod-like (cylindrical) member that is locked by the first locking portion 60 or the second locking portion 70. The lock pin 52 is preferably a member having high rigidity, for example, made of metal. Part of the lock pin 52 is positioned inside the support member 26 rotatably supporting the vertical roller 21. The lock pin 52 is inserted into the hollow portion 26a of the support member 26, and is arranged so that the extending direction of the lock pin 52 is aligned along the rotation axis L of the vertical roller 21. The lock pin 52 is provided so as to be capable of protruding and retracting along the rotation axis L of the vertical roller 21. In FIG. 7, a gap is formed between the outer circumferential surface of the lock pin 52 and the inner circumferential surface of the support member 26. In other words, the outer diameter of the lock pin 52 is smaller than the inner diameter of the support member 26. However, the outer circumferential surface of the lock pin 52 may be in contact with the inner circumferential surface of the support member 26. In other words, the outer diameter of the lock pin 52 and the inner diameter of the support member 26 may be substantially the same. A tip (end positioned on the side surface 17e side) of the lock pin 52 is chamfered, and thus has a round shape.

The spring 54 is a biasing member that biases the lock pin 52. The spring 54 is a coil spring, for example. The spring 54 is arranged at an end of the lock pin 52 on the opposite side to the tip thereof. The spring 54 biases the lock pin 52 toward the side surface 17e (see FIG. 7) of the middle slide rail 17. The lock pin 52 is always biased by the spring 54 toward the side surface 17e of the middle slide rail 17.

The linkage member 56 links the lock pin 52 to the slide-door outer door handle 8 and the slide-door inner door handle 9. The linkage member 56 is a wire, for example. When the slide-door outer door handle 8 or the slide-door inner door handle 9 is operated (opening operation is performed), the linkage member 56 pulls the lock pin 52 in a direction in which the lock pin 52 retracts (direction opposite to the direction biased by the spring 54). Consequently, the lock pin 52 is pulled out of the first locking portion 60 or the second locking portion 70, and thus released from locking with the first locking portion 60 or the second locking portion 70.

The first locking portion 60 engages with the portion to be locked 50 in the fully closed position in which the slide door 6 closes the front area of the rear door opening portion 4. The first locking portion 60 is arranged, in the middle slide rail 17, at a position that corresponds to the portion to be locked 50 when the slide door 6 is in the fully closed position. The first locking portion 60 is provided to the bent rail portion 17b of the middle slide rail 17. Specifically, the first locking portion 60 is provided at a position that faces the lock pin 52 provided to the guided body 18 when the slide door 6 is in the fully closed position in which the slide door 6 closes the front area of the rear door opening portion 4.

Figure 6A:
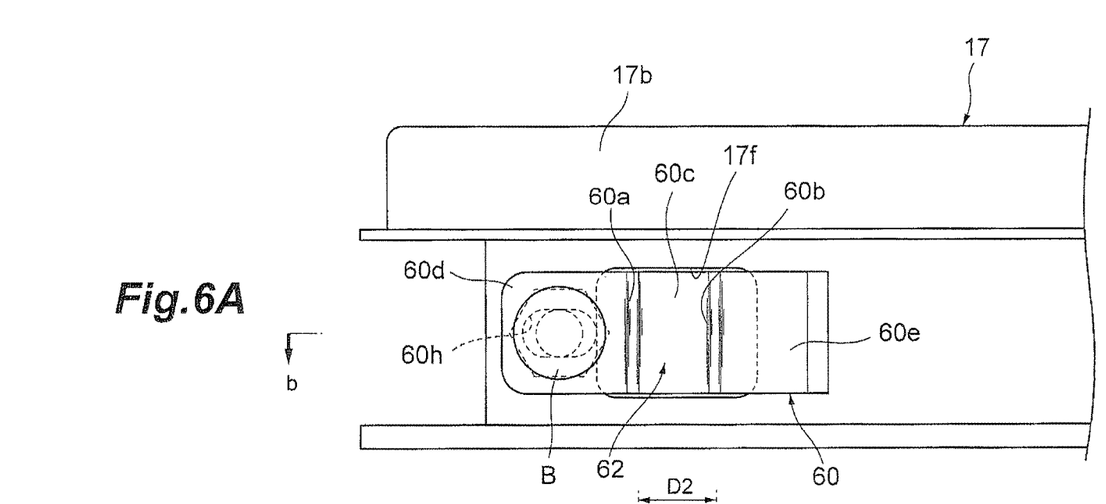
FIG. 6A is a diagram illustrating a state in which a locking portion is attached to a middle slide rail.
Figure 6B:
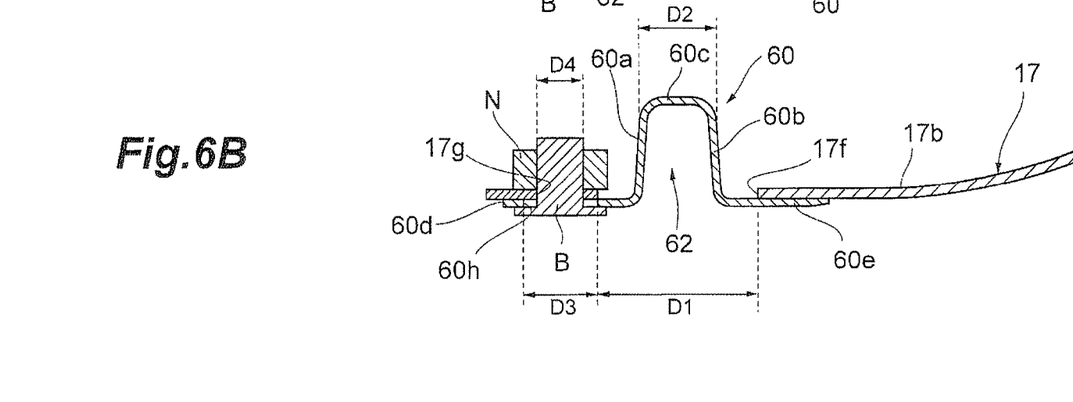
FIG. 6B is a sectional view along line b-b in FIG. 6A.

As depicted in FIGS. 6A and 6B, the first locking portion 60 includes a pair of side portions 60a and 60b facing each other, a top portion 60c joining the pair of side portions 60a and 60b end to end, and flange portions 60d and 60e extending outward from the other ends of the side portions 60a and 60b in a manner substantially parallel to the top portion 60c. The pair of side portions 60a and 60b and the top portion 60c substantially form a U-shape. The first locking portion 60 is forming by bending a metallic plate member, for example. On the first locking portion 60, an accommodating portion 62 is formed by the pair of side portions 60a and 60b and the top portion 60c. The accommodating portion 62 accommodates the tip side of the lock pin 52 as depicted in FIG. 5. On the flange portion 60d, a through hole 60h is formed. The through hole 60h is a long hole that is long in the facing direction of the pair of side portions 60a and 60b.

The first locking portion 60 is attached to the middle slide rail 17. On the bent rail portion 17b of the middle slide rail 17, a mounting hole 17f having a substantially rectangular shape and a through hole 17g having a substantially circular shape are formed. The width D1 of the mounting hole 17f is larger than the distance D2 between the side portion 60a and the side portion 60b of the first locking portion 60. Part (the side portions 60a and 60b and the top portion 60c) of the first locking portion 60 is inserted into the mounting hole 17f from the inside of the middle slide rail 17. Consequently, the pair of side portions 60a and 60b and the top portion 60c of the first locking portion 60 protrude from the middle slide rail 17. The flange portions 60d and 60e and the side surface 17e of the middle slide rail 17 are arranged facing each other. The through hole 60h formed on the flange portion 60d is positioned corresponding to the through hole 17g formed on the bent rail portion 17b.

The first locking portion 60 is fixed on the middle slide rail 17 by a bolt B and a nut N. Specifically, the bolt B is inserted into the through hole 60h and the mounting hole 17f from the inside of the middle slide rail 17, and is fastened by the nut N arranged outside the middle slide rail 17. This fixes the first locking portion 60 on the middle slide rail 17. Herein, the width D3 of the through hole 60h is larger than the width D4 of the bolt B, and the width D1 of the mounting hole 17f is larger than the distance D2 between the pair of side portions 60a and 60b. This allows the first locking portion 60 to be moved in the extending direction of the middle slide rail 17 with the bolt B being inserted into the through hole 60h. Thus, the attachment position of the first locking portion. 60 in the middle slide rail 17 is adjustable.

The second locking portion 70 engages with the portion to be locked 50 in the fully open position in which the slide door 6 fully opens the front area of the rear door opening portion 4. The second locking portion 70 is arranged in the main rail portion 17a of the middle slide rail 17. Specifically, the second locking portion 70 is provided at a position that faces the lock pin 52 provided to the guided body 18 when the slide door 6 is in the fully open position in which the slide door 6 fully opens the front area of the rear door opening portion 4.

Figure 8:
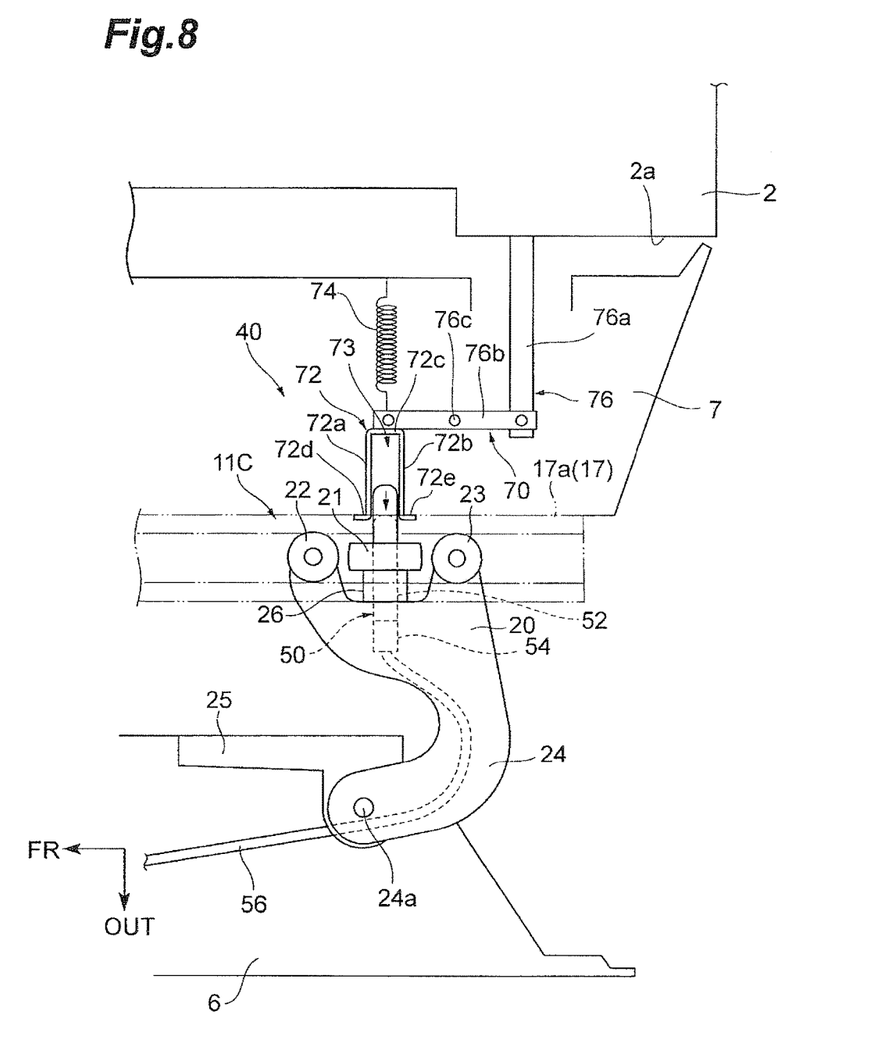
FIG. 8 is a diagram illustrating a state of a second locking portion when the swing door is closed.
Figure 9:
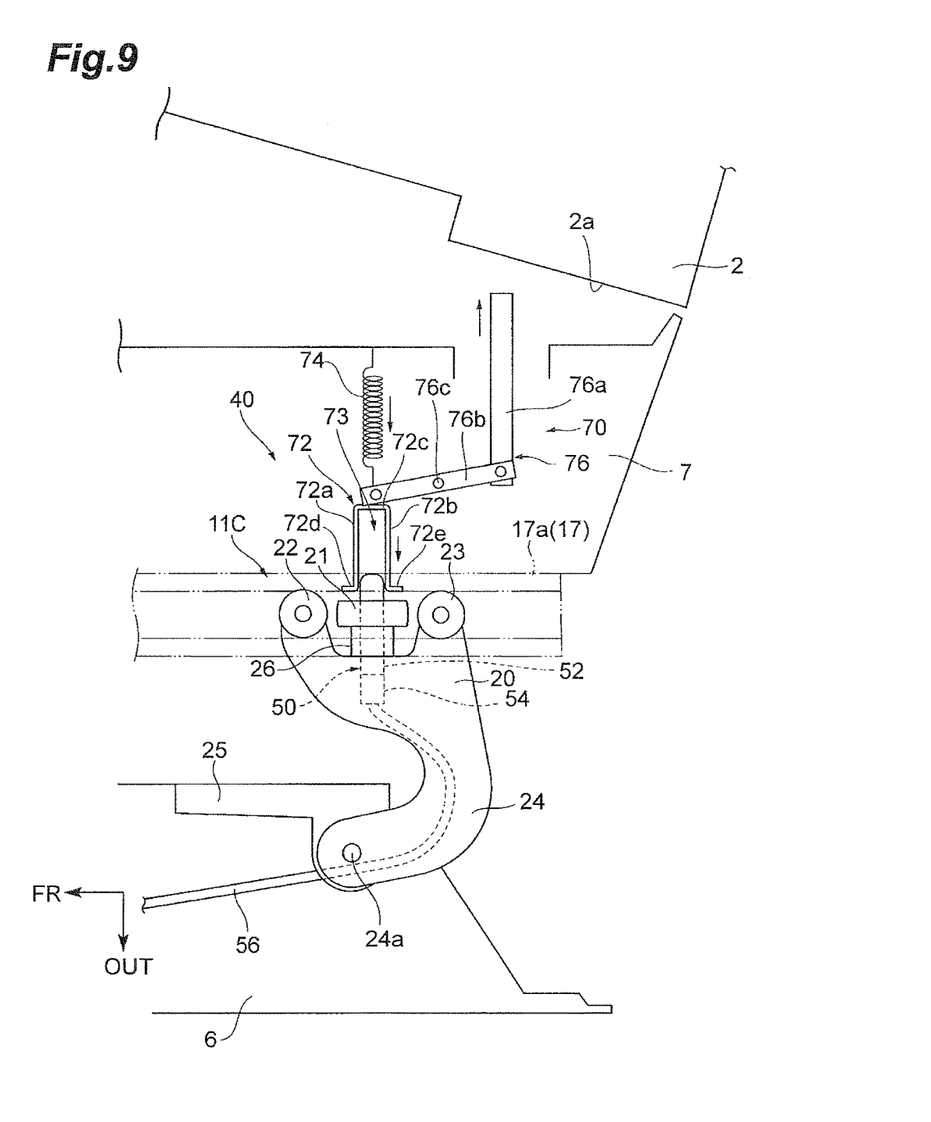
FIG. 9 is a diagram illustrating movement of the second locking portion when the swing door is opened.

FIG. 8 is a diagram illustrating a state of the second locking portion when the swing door is closed. FIG. 9 is a diagram illustrating movement of the second locking portion when the swing door is opened. As depicted in FIG. 8 and FIG. 9, the second locking portion 70 includes a locking member 72, a spring (biasing member) 74, and a link portion (control portion) 76.

The locking member 72 is a member configured to engage with the lock pin 52. The locking member 72 includes a pair of side portions 72a and 72b facing each other, a top portion 72c joining the pair of side portions 72a and 72b end to end, and flange portions 72d and 72e extending outward from the other ends of the side portions 72a and 72b in a manner substantially parallel to the top portion 72c. The pair of side portions 72a and 72b and the top portion 72c substantially form a U-shape. The locking member 72 is formed by bending a metallic plate member, for example. On the locking member 72, an accommodating portion 73 is formed by the pair of the side portions 72a and 72b and the top portion 72c. The accommodating portion 73 accommodates the tip side of the lock pin 52.

The locking member 72 is arranged in a hole (not depicted) formed on the side surface 17e of the middle slide rail 17, and the flange portions 72d and 72e are positioned inside the middle slide rail 17. The width of the hole formed on the side surface 17e is smaller than the distance between an end of the flange portion 72d and an end of the flange portion 72e. Accordingly, the locking member 72 is arranged so that the flange portions 72d and 72e face the side surface 17e. The locking member 72 is provided so as to be capable of protruding and retracting in the middle slide rail 17, in accordance with opening and closing of the swing door 7, along a direction in which the slide door 6 overlaps the swing door 7. Specifically, the locking member 72 is configured to be movable between a position (initial position) in which the flange portions 72d and 72e come in contact with the side surface 17e of the middle slide rail 17 and a position in which the flange portions 72d and 72e are separated from the side surface 17e of the middle slide rail 17 to protrude inside the middle slide rail 17. As depicted in FIG. 9, the protrusion amount of the locking member 72 is set so that at least the tip of the lock pin 52 is positioned within the accommodating portion 73 when the lock pin 52 retracts.

The spring 74 is a biasing member that biases the locking member 72. The spring 74 is a coil spring, for example. On end of the spring 74 is connected to the top portion 72c of the locking member 72, and the other end thereof is connected to the swing door 7. The spring 74 biases the locking member 72 toward the portion to be locked 50 (outward of the vehicle body 2). Specifically, the spring 74 is in a steady state when the locking member 72 has been allowed to protrude, and is in a compressed state when being at a position in which the locking member 72 has retracted. The locking member 72 is always biased by the spring 74 in a protruding direction.

The link portion 76 allows the protrusion of the locking member 72 by biasing force of the spring 74 when the swing door 7 is opened, and restricts the protrusion of the locking member 72 when the swing door 7 is closed. The link portion 76 includes a detection member 76a and a linkage member 76b.

The detection member 76a moves in accordance with opening and closing of the swing door 7. The detection member 76a is a substantially columnar member, arranged extending along the direction in which the slide door 6 overlaps the swing door 7 (width direction of the vehicle body 2). The detection member 76a is in contact with a body surface 2a of the vehicle body 2 when the swing door 7 is in a closed state. A tip of the detection member 76a is separated from the body surface 2a of the vehicle body 2 when the swing door 7 is opened.

The linkage member 76b moves in conjunction with the detection member 76a. One end of the linkage member 76b is connected to the locking member 72 and the spring 74, and the other end thereof is connected to the detection member 76a. The linkage member 76b is rotatably supported about a shaft 76c at a central part thereof in the longitudinal direction. The linkage member 76b moves by biasing force of the spring 74 in conjunction with the movement of the detection member 76a, thereby causing the locking member 72 to protrude or retract.

In the second locking portion 70 having the above-described configuration, as depicted in FIG. 8, when the swing door 7 is in the closed state, the detection member 76a of the link portion 76 is in contact with the body surface 2a. In this state, rotation of the linkage member 76b of the link portion 76 is restricted by the detection member 76a. The locking member 72 is positioned in an initial position in which the flange portions 72d and 72e are in contact with the side surface 17c of the middle slide rail 17. At this time, the spring 74 is in the compressed state, biasing the locking member 72.

In the second locking portion 70, as depicted in FIG. 9, when the swing door 7 is opened, the detection member 76a of the link portion 76 is separated from the swing door 7. This allows the rotation of the linkage member 76b of the link portion 76. Accordingly, the spring 74 is allowed to stretch, and the locking member 72 protrudes toward the lock pin 52 (portion to be locked 50) by biasing force of the spring 74.

Figures 10A, 10B:
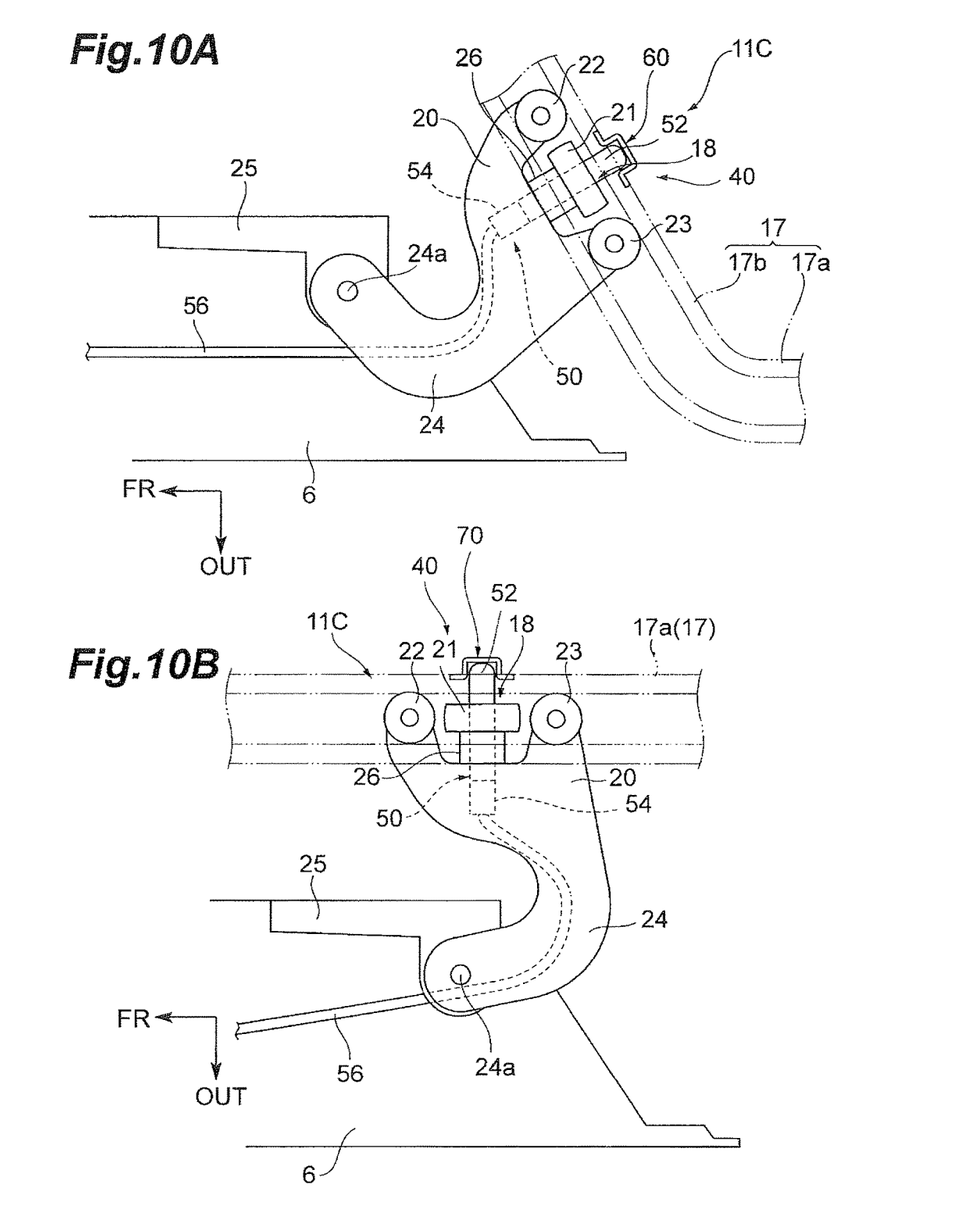
FIG. 10A is a diagram illustrating a state in which the portion to be locked and the locking portion are locked together in a bent rail portion.
FIG. 10B is a diagram illustrating a state in which the portion to be locked and the locking portion are locked together in a main rail portion.

The following describes movement of the lock mechanism 40 with reference to FIG. 8 to FIG. 10B. FIG. 10A is a diagram illustrating a state in which the portion to be locked and the locking portion are locked together in the bent rail portion, and FIG. 10B is a diagram illustrating a state in which the portion to be locked and the locking portion are locked together in the main rail portion.

Movement of the lock mechanism 40 when the state of the slide door 6 is changed from the fully closed state to the fully open state will be described first. As depicted in FIG. 10A, when the slide door 6 is in the fully closed position, the lock mechanism 40 locks sliding of the slide door 6. Specifically, the lock pin 52 of the portion to be locked 50 is inserted into the accommodating portion 62 of the first locking portion 60 provided to the bent rail portion 17*b*. When the slide-door outer door handle 8 or the slide-door inner door handle 9 is operated, the linkage member 56 is pulled, and the linkage member 56 causes the lock pin 52 to retract. This pulls out the lock pin 52 from the accommodating portion 62 of the first locking portion 60 to release the locking between the portion to be locked 50 and the first locking portion 60, thereby allowing the slide door 6 to slide.

When the slide door 6 is slid, the lock pin 52 of the portion to be locked 50 slides while being pressed against the side surface 17*e* of the middle slide rail 17 by the spring 54. When the slide door 6 reaches the fully open position, the portion to be locked 50 is positioned facing the second locking portion 70, and the lock pin 52 biased by the spring 54 protrudes toward the second locking portion 70 to be inserted into the accommodating portion 73 of the locking member 72 of the second locking portion 70. This locks sliding of the slide door 6 in the fully open position.

When the swing door 7 is opened with the slide door 6 being on the fully open position, as depicted in FIG. 9, the locking member 72 of the second locking portion 70 protrudes toward the lock pin 52. Consequently, for example, even if the slide-door outer door handle 8 is operated with the swing door 7 being opened, because the locking member 72 of the second locking portion 70 has protruded toward the lock pin 52, the lock pin 52 is positioned within the accommodating portion 73 of the locking member 72 to be locked together. Thus, sliding of the slide door 6 is restricted.

The following describes movement of the lock mechanism 40 when the state of the slide door 6 is changed from the fully open state to the fully closed state. As depicted in FIG. 10B, the lock mechanism 40 locks sliding of the slide door 6 when the slide door 6 is in the fully open position. Specifically, the lock pin 52 of the portion to be locked 50 is inserted into the accommodating portion 73 of the second locking portion 70 provided to the main rail portion 17*a*. When the slide-door outer door handle 8 or the slide-door inner door handle 9 is operated with the swing door 7 being closed, the linkage member 56 is pulled, and the linkage member 56 causes the lock pin 52 to retract. This pulls out the lock pin 52 from the accommodating portion 73 of the second locking portion 70 to release the locking between the portion to be locked 50 and the second locking portion 70, thereby allowing the slide door 6 to slide.

When the slide door 6 is slid, the lock pin 52 of the portion to be locked 50 slides while being pressed against the side surface 17*e* of the middle slide rail 17 by the spring 54. When the slide door 6 reaches the fully closed position, as depicted in FIG. 10A, the portion to be locked 50 is positioned facing the first locking portion 60, and the lock pin 52 biased by the spring 54 protrudes toward the first locking portion 60 to be inserted into the accommodating portion 62 of the first locking portion 60. This locks sliding of the slide door 6 in the fully closed position.

As described in the foregoing, the vehicle door structure 1 of the present embodiment includes the lock mechanism 40 that locks sliding of the slide door 6 in the fully closed position in which the slide door 6 closes the rear door opening portion 4 and in the fully open position in which the slide door 6 opens the rear door opening portion 4. The lock mechanism 40 includes the second locking portion 70 provided to the middle slide rail 17 and arranged at the position that corresponds to the portion to be locked 50 when the slide door 6 is in the fully open position. The second locking portion 70 protrudes toward the portion to be locked 50 when the swing door 7 is opened. For example, as depicted in FIG. 9, when slide-door outer door handle 8 is operated and the tip of the lock pin 52 retracts, if the locking member 72 is in the position depicted in FIG. 8, the lock pin 52 falls out from the locking member 72. In this case, because the slide door 6 can be slid with the swing door 7 being opened, the swing door 7 may come out of the slide door 6. In the present embodiment, as depicted in FIG. 9, because the second locking portion 70 has protruded toward the portion to be locked 50, even if the lock pin 52 retracts, the locked state between the portion to be locked 50 and the second locking portion 70 is maintained. Thus, in the vehicle door structure 1, the slide door 6 can be prevented from coming out of the swing door 7.

In the present embodiment, the second locking portion 70 is provided so as to be capable of protruding and retracting, in accordance with opening and closing of the swing door 7, along a direction in which the slide door 6 overlaps the swing door 7. This allows the second locking portion 70 to protrude and retract in a direction orthogonal to the sliding direction of the slide door 6, which makes it possible to more effectively prevent the slide door 6 from coming out of the swing door 7.

In the present embodiment, the second locking portion 70 includes: the locking member 72 configured to lock the portion to be locked 50; the spring 74 configured to bias the locking member 72 in a direction of protruding toward the portion to be locked 50; and the link portion 76 configure to allow protrusion of the locking member 72 by biasing force of the spring 74 when the swing door 7 is opened, and to restrict the protrusion of the locking member 72 when the swing door 7 is closed. This configuration makes it possible to cause the locking member 72 to protrude to be engaged with the portion to be locked 50 when the swing door 7 is opened, and also makes it possible to restrict the protrusion of the locking member 72 when the swing door 7 is closed.

In the present embodiment, the portion to be locked 50 retracts in accordance with operation of the slide-door outer door handle 8 or the slide-door inner door handle 9 configured to control opening and closing of the slide door 6 and is released from the locked state with the first locking portion 60 or with the second locking portion 70. This enables locking of sliding of the slide door 6 to be released by operating the slide-door outer door handle 8 or the slide-door inner door handle 9. Even if the portion to be locked 50 is configured to retract when the slide-door outer door handle 8 or the slide-door inner door handle 9 is operated, because the second locking portion 70 has protruded toward the portion to be locked 50 when the swing door 7 is opened, the locked state between the portion to be locked 50 and the second locking portion 70 is not released even when the slide-door outer door handle 8 or the slide-door inner door handle 9 is operated. Thus, when the swing door 7 is opened, operation of the slide-door outer door handle 8 or the slide-door inner door handle 9 can be disabled.

The present invention is not limited to the above-described embodiment. For example, in the above-described embodiment, a mode has been described as one example, in which the locking member 72 of the second locking portion 70 protrudes toward the portion to be locked 50 along the direction in which the slide door 6 overlaps the swing door 7. However, the configuration of the second locking portion 70 is not limited to this.

Figure 11:
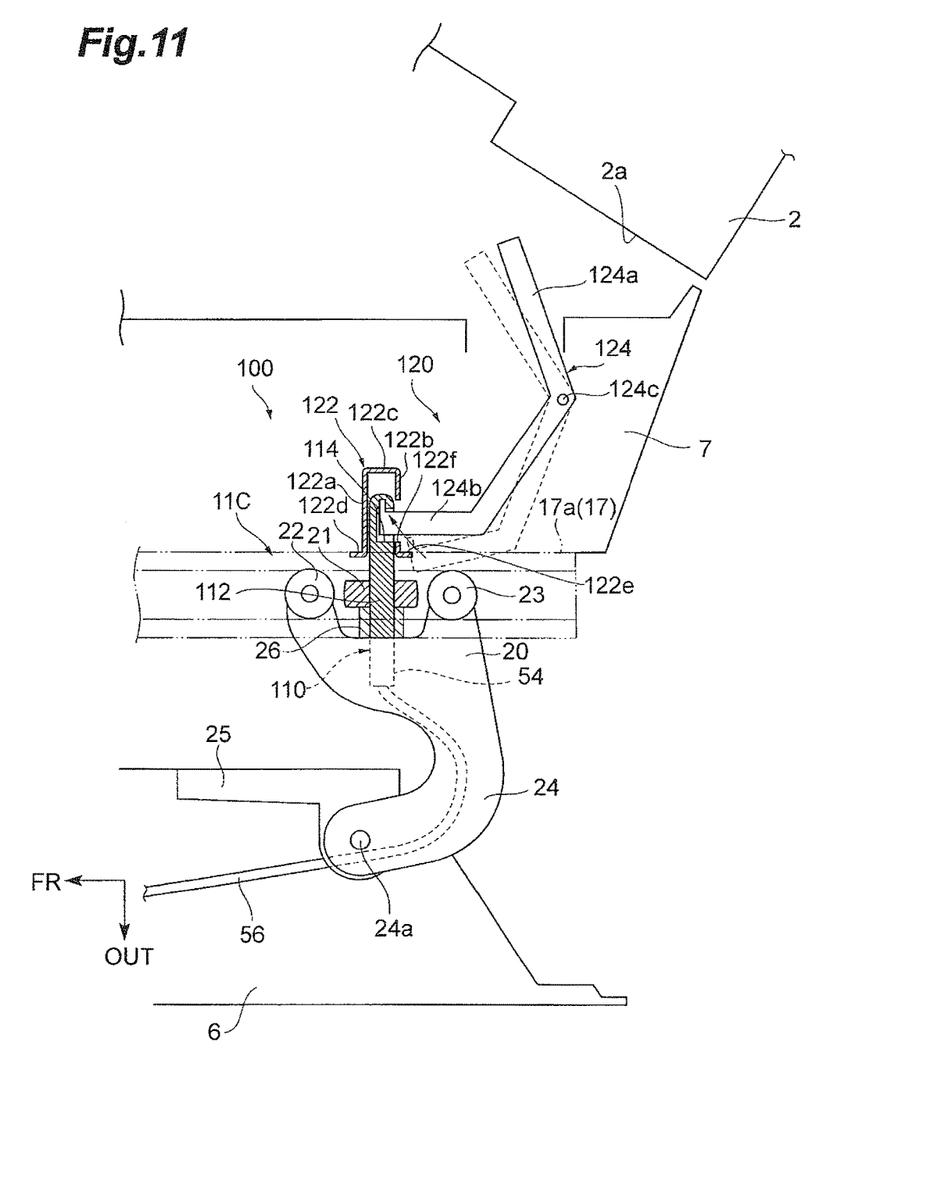
FIG. 11 is a diagram illustrating a configuration of a second locking portion of a vehicle door structure according to another embodiment.

FIG. 11 is a diagram schematically illustrating a lock mechanism of a vehicle door structure according to another embodiment. As depicted in FIG. 11, this lock mechanism 100 includes a portion to be locked 110 and a second locking portion 120. The portion to be locked 110 includes a lock pin 112. Configuration of the portion to be locked 110 except the lock pin 112 is the same as that of the portion to be locked 50.

The lock pin 112 includes an engagement recess 114. The engagement recess 114 is a portion configured to be engaged with a lock member 124 described later. The engagement recess 114 is formed on a tip side of the lock pin 112. The engagement recess 114 is formed, for example, by hollowing part of the lock pin 112.

The second locking portion 120 includes a locking member 122 and the lock member (control portion) 124. Similarly to the locking member 72, the locking member 122 includes a pair of side portions 122a and 122b facing each other, a top portion 122c joining the pair of side portions 122a and 122b end to end, and flange portions 122d and 122e extending outward from the other ends of the side portions 122a and 122b in a manner substantially parallel to the top portion 122c. Configuration of the locking member 122 is different from that of the locking member 72 in that an insertion hole 122f is formed on the side portion 122b. The locking member 122 is fixed on the middle slide rail 17 in the same configuration as the first locking portion 60.

The lock member 124 moves toward the lock pin 112 of the portion to be locked 110 when the swing door 7 is opened. The lock member 124 includes: a detection portion 124a configured to come in contact with the body surface 2a of the vehicle body 2 when the swing door 7 is closed, and to be separated from the body surface 2a when the swing door 7 is opened; and a locking portion 124b configured to lock the lock pin 112 when the swing door 7 is opened. The lock member 124 is pivotally provided about a shaft 124c, and is always biased by a biasing member (not depicted) clockwise.

In the lock member 124, as indicated by a dashed line in FIG. 11, when the swing door 7 is closed, the detection portion 124a is in contact with the body surface 2a of the vehicle body 2, and the locking portion 124b is positioned outside the locking member 122. When the swing door 7 is opened, the detection portion 124a is separated from the body surface 2a of the vehicle body 2. Accordingly, the lock member 124 rotates clockwise about the shaft 124c by a biasing member to move into the engagement recess 114 of the lock pin 112 through the insertion hole 122f of the locking member 122. This causes the locking portion 124b of the lock member 124 to enter the engagement recess 114 of the lock pin 112. Consequently, even if the lock pin 112 moves in a retracting direction, the lock member 124 engaged with the engagement recess 114 is in contact with the locking member 122, which restricts the movement of the lock pin 112. Thus, falling of the lock pin 112 out from the locking member 122 can be restricted, thereby the slide door 6 can be prevented from coming out of the swing door 7.

In FIG. 11, a mode in which the lock member 124 pivotally rotates to move toward the lock pin 112 or move backward from the lock pin 112 in accordance with opening and closing of the swing door 7 is illustrated as one example. However, any other configuration may be used that uses a mode in which a lock member moves toward a lock pin or moves backward from the lock pin in accordance with opening and closing of the swing door 7.

In the above-described embodiments, a configuration including the slide door 6 and the swing door 7 on a side portion of the vehicle body 2 has been described as one example, but the slide door 6 and the swing door 7 may be provided to a rear portion of the vehicle body 2.

In the above-described embodiments, a mode has been described as one example, in which the lock mechanism 40 is configured with the portion to be locked 50 provided to the guided body 18 of the slide support mechanism 11C and the first locking portion 60 and the second locking portion 70 provided to the middle slide rail 17. However, the lock mechanism may be provided to the slide support mechanism 11A and/or the slide support mechanism 11B.

In the above-described embodiments, a mode including the vertical roller 21 and the two horizontal rollers 22 and 23 has been described as one example, but the respective numbers of vertical rollers and horizontal rollers are not limited to this.

In the above-described embodiments, the tip of the lock pin 52 having a round shape has been described as one example, but the tip of the lock pin 52 may be provided with a roller. Alternatively, at least the tip of the lock pin 52 may be coated with a wear-resistant member. The lock pin 52 slides while being pressed against the middle slide rail 17. In view of this, providing a roller to the tip of the lock pin 52 or coating the tip with a wear-resistant member can prevent wear of the lock pin 52.

In the above-described embodiments, opening and closing of the swing door 7 are detected by the detection member 76a of the link portion 76 or the lock member 124 to cause the locking member 72 to protrude or cause the lock member 124 to move, but any other configuration may be used. Specifically, by detecting opening and closing of the swing door 7 with a courtesy switch, for example, various operations may be performed based on detection signals therefrom. In this case, operation of the locking member or the lock member may be performed by an actuator, for example.

What is claimed is:

1. A vehicle door structure comprising:
   a slide door configured to slidingly open and close one partial area of a door opening portion formed on a vehicle body;
   a swing door pivotally attached to the vehicle body via a pivotal support mechanism and configured to externally support the slide door at least when the slide door is fully opened, and to open and close another partial area of the door opening portion together with the slide door that is fully opened;
   a slide mechanism including a slide rail provided extending in a sliding direction of the slide door in which the one partial area is opened and closed and a guided body guided by the slide rail, the slide mechanism being configured to slide the slide door; and
   a lock mechanism configured to lock sliding of the slide door in a fully closed position in which the slide door closes the door opening portion and in a fully open position in which the slide door fully opens the door opening portion, wherein
   the lock mechanism comprises:
      a guided body locking portion provided to the guided body;
      a first locking portion provided to the slide rail and arranged at a first position that corresponds to a position of the guided body locking portion when the slide door is in the fully closed position; and
      a second locking portion provided to the slide rail and arranged at a second position that corresponds to the position of the guided body locking portion when the slide door is in the fully open position, and the guided body locking portion, in the fully closed position or the fully open position, protrudes toward the first locking portion or the second locking portion and is locked by the first locking portion or the second locking portion, and the second locking portion protrudes toward the guided body locking portion when the swing door is opened.

2. The vehicle door structure according to claim 1, wherein the second locking portion is provided so as to be capable of protruding and retracting, in accordance with opening and closing of the swing door, along a direction in which the slide door overlaps the swing door.

3. The vehicle door structure according to claim 2, wherein the second locking portion comprises:
  a locking member configured to lock the guided body locking portion;
  a biasing member configured to bias the locking member in a direction of protruding toward the guided body locking portion; and
  a control portion configured to allow protrusion of the locking member by biasing force of the biasing member when the swing door is opened, and to restrict the protrusion of the locking member when the swing door is closed.

4. The vehicle door structure according to claim 1, wherein the guided body locking portion retracts in accordance with operation of an operating portion configured to control opening and closing of the slide door and is released from a locked state with the first locking portion or with the second locking portion.

* * * * *